(12) United States Patent
Ashida et al.

(10) Patent No.: US 7,276,268 B2
(45) Date of Patent: Oct. 2, 2007

(54) POLY-AZO COMPOUND, AND POLARIZATION FILM HAVING SAID COMPOUND

(75) Inventors: Toru Ashida, Toyonaka (JP); Narutoshi Hayashi, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 248 days.

(21) Appl. No.: 10/986,218

(22) Filed: Nov. 12, 2004

(65) Prior Publication Data

US 2005/0127335 A1  Jun. 16, 2005

(30) Foreign Application Priority Data

Nov. 17, 2003 (JP) ............................. 2003-386304

(51) Int. Cl.
*C09B 45/24* (2006.01)
*C09B 31/072* (2006.01)

(52) U.S. Cl. ................ 428/1.31; 349/97; 349/165; 359/491; 252/585; 8/641; 8/681; 8/687; 534/714; 534/717; 534/809; 534/884

(58) Field of Classification Search ............... 428/1.31; 252/585; 8/639, 641, 681, 687, 489; 534/714, 534/717, 809, 884, 827, 829, 806, 811; 349/80, 349/97, 165; 359/491
See application file for complete search history.

(56) References Cited

U.S. PATENT DOCUMENTS

| | | | |
|---|---|---|---|
| 6,699,976 B2 * | 3/2004 | Ashida et al. | 534/714 |
| 6,790,490 B1 * | 9/2004 | Oiso et al. | 428/1.31 |
| 7,108,897 B2 * | 9/2006 | Oiso et al. | 428/1.31 |

FOREIGN PATENT DOCUMENTS

| | | |
|---|---|---|
| EP | 0549342 A2 | 6/1993 |
| JP | 5-295281 A | 11/1993 |
| JP | 10-259311 A * | 9/1998 |

* cited by examiner

*Primary Examiner*—Rena Dye
*Assistant Examiner*—Sow-Fun Hon
(74) *Attorney, Agent, or Firm*—Birch, Stewart, Kolasch & Birch, LLP

(57) ABSTRACT

Poly-azo compound selected from the group consisting compounds of the formula (I) and compounds of the formula (II),

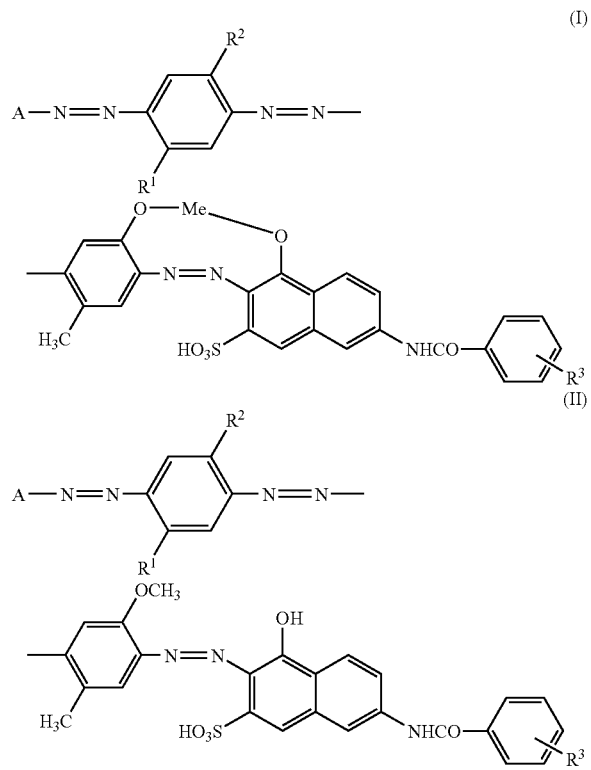

(wherein, Me represents copper, nickel, zinc or iron, A represents a naphthyl group having 1 to 3 sulfonic groups and further optionally having an alkyl group or alkoxy group, $R^1$ and $R^2$ represent each independently a hydrogen atom, alkyl group or alkoxy group, and $R^3$ represents an amino group or hydroxyl group.).

5 Claims, No Drawings

POLY-AZO COMPOUND, AND POLARIZATION FILM HAVING SAID COMPOUND

BACKGROUND OF THE INVENTION

1. Technical Field of the Invention

The present invention relates to a poly-azo compound, and a polarization film having said compound.

2. Description of the Related Art

Recently, there is a demand for further improvement in the degree of polarization of a polarization film. Further, displays mounted on automobiles such as car navigations and the like are used under environments for irradiation with day light and liquid crystal displays such as a liquid crystal projector, television for projection and the like are used under environments for irradiation with light of large quantity, therefore, there is required, for this application, a polarization film manifesting small decrease in the absorbance of the polarization film even under irradiation with light of large quantity under high temperature environments for a long period of time, namely, having excellent light resistance.

As the polarization film, there are known films containing a dye covering desired wavelength as a polarization element in a polarization film substrate such as a polyvinyl alcohol-based film oriented by streching, or a polyene-based film obtained by orientation to produce a polyene by de-hydrochloric acid of a polyvinyl chloride film or by dehydration of a polyvinyl alcohol film, and the like.

As the specific polarization element of a polarization film, there are known dyes containing a compound of the following formula (B) as an effective ingredient, however, the degree of polarization of a polarization film containing the dye is 98%, and light resistant is also insufficient (JP-A No. 5-295281, Example 63).

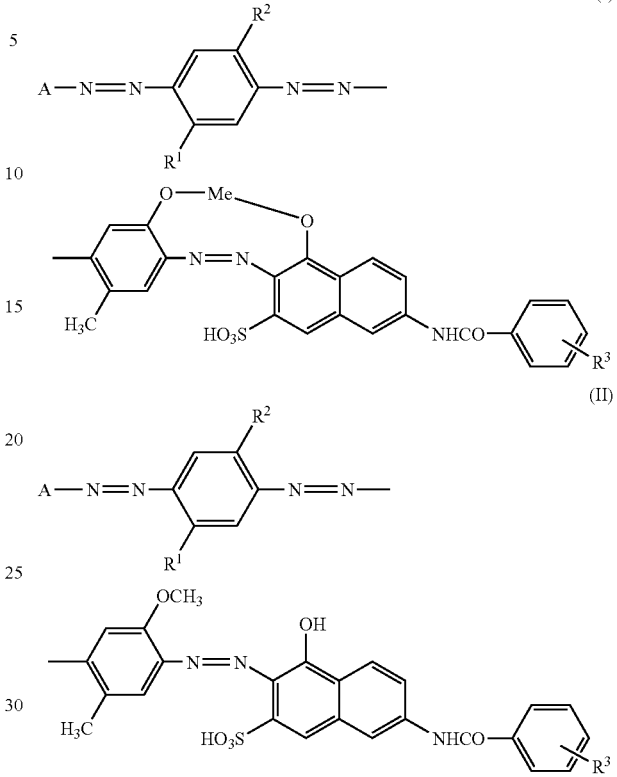

(wherein, Me represents copper, nickel, zinc or iron, A represents a naphthyl group having 1 to 3 sulfonic groups and further optionally having an alkyl group or alkoxy group, $R^1$ and $R^2$ represent each independently a hydrogen atom, alkyl group or alkoxy group, and $R^3$ represents an amino group or hydroxyl group.).

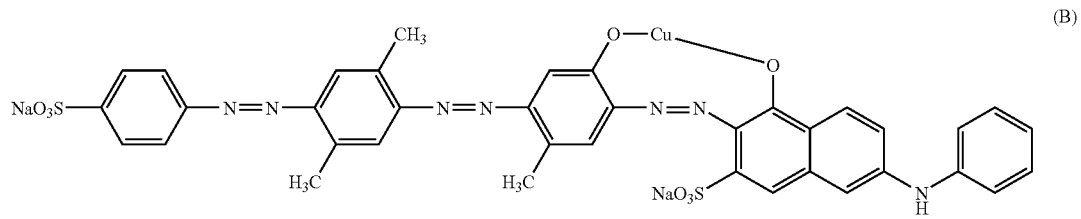

DISCLOSURE OF THE INVENTION

An object of the present invention is to provide a poly-azo compound used as a dye for polarization film having excellent degree of polarization and further imparting a polarization film excellent in light resistance.

Namely, the present invention provides the following [1] to [8].

[1] Poly-azo compound selected from the group consisting of compounds of the formula (I) and compounds of the formula (II),

[2] The poly-azo compound according to [1], wherein $R^1$ represents a hydrogen atom, methyl group or methoxy group.

[3] The poly-azo compound according to [1], wherein $R^2$ represents a hydrogen atom, methyl group or methoxy group.

[4] A polarization film comprising a dye for polarization film containing the poly-azo compound according to any of [1] to [3], and a polarization film substrate.

[5] The polarization film according to [4], wherein the dye for polarization film further contains an organic dye different from the poly-azo compound.

[6] The polarization film according to [5], wherein the organic dye is at least one selected from the group consisting of organic dyes represented by the following Color Index Generic Name:

C. I. Direct Yellow 12,
C. I. Direct Yellow 28,
C. I. Direct Yellow 44,
C. I. Direct Orange 26,
C. I. Direct Orange 39,
C. I. Direct Orange 107,
C. I. Direct Red 2,
C. I. Direct Red 31,
C. I. Direct Red 79,
C. I. Direct Red 81,
C. I. Direct Red 117,
C. I. Direct Red 247.

[7] The polarization film according to any of [4] to [6], wherein the polarization film substrate is a substrate made of a polyvinyl alcohol resin.

[8] A liquid crystal display comprising the polarization film according to [7].

The poly-azo compound of the present invention is at least one selected from the group consisting compounds of the formula (I) and compounds of the formula (II).

Here, the poly-azo compound of the present invention includes the poly-azo compound itself and salt thereof.

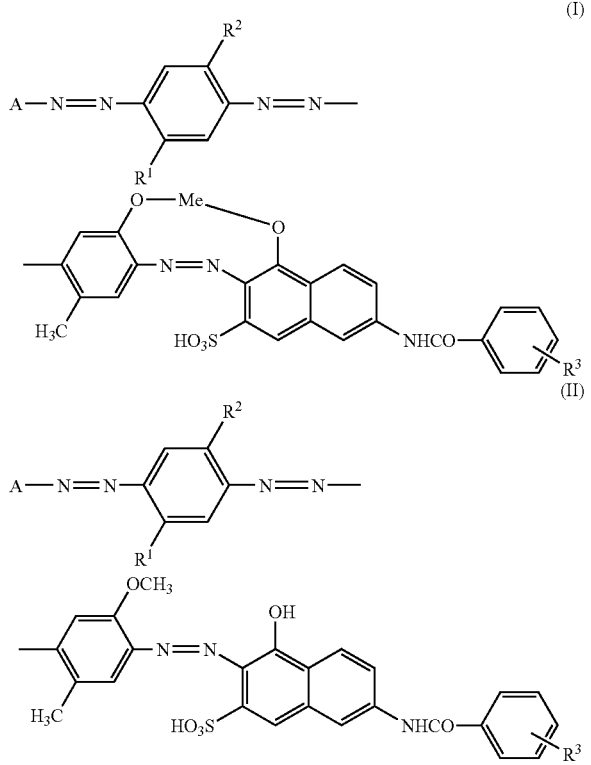

In the formulae, Me represents a transition metal selected from the group consisting of copper, nickel, zinc and iron, A represents a naphthyl group having 1 to 3 sulfonic groups and further optionally having an alkyl group or alkoxy group, $R^1$ and $R^2$ represent each independently a hydrogen atom, alkyl group or alkoxy group, and $R^3$ represents an amino group or hydroxyl group.

As the poly-azo compound of the present invention (hereinafter, generically referred to as the present compound in some cases), compounds of the formula (I) are preferable since they impart a polarization film excellent in light resistance.

In the formulae (I) and (II), Me represents a transition metal selected from the group consisting of copper, nickel, zinc and iron, and among them, copper is preferable.

A represents a naphthyl group having 1 to 3 sulfonic groups and further optionally having an alkyl group or alkoxy group.

Here, as the alkyl group, for example, a methyl group, ethyl group, propyl group and the like are listed, and among them, a methyl group is preferable. As the alkoxy group, for example, a methoxy group, ethoxy group, propoxy group and the like are listed, among them, a methoxy group is preferable.

Listed as A are, for example, naphthyl groups having one sulfonic group such as a 5-sulfo-2-naphthyl group, 6-sulfo-2-naphthyl group, 7-sulfo-2-naphthyl group, 8-sulfo-2-naphthyl group, 4-sulfo-1-naphthyl group, 5-sulfo-1-naphthyl group, 6-sulfo-1-naphthyl group, 7-sulfo-1-naphthyl group and the like; naphthyl groups having two sulfonic groups such as a 1,5-disulfo-2-naphthyl group, 6,8-disulfo-2-naphthyl group, 4,8-disulfo-2-naphthyl group, 5,7-disulfo-2-naphthyl group, 3,6-disulfo-2-naphthyl group, 3,6-disulfo-1-naphthyl group, 4,6-disulfo-1-naphthyl group and the like; a 1,5,7-trisulfo-2-naphthyl group, 3,6,8-trisulfo-2-naphthyl group, 4,6,8-trisulfo-2-naphthyl group and the like.

Preferable as A are naphthyl groups having 2 to 3 sulfonic groups from a standpoint of dyeing, and particularly preferable are a 1,5-disulfo-2-naphthyl group, 6,8-disulfo-2-naphthyl group, 4,8-disulfo-2-naphthyl group, 5,7-disulfo-2-naphthyl group and 3,6-disulfo-2-naphthyl group.

$R^1$ and $R^2$ represent each independently a hydrogen atom, alkyl group or alkoxy group. As the alkyl group and alkoxy group, the same groups as described above are listed.

$R^1$ represents preferably a hydrogen atom, methyl group or methoxy group, and $R^2$ represents preferably a hydrogen atom, methyl group or methoxy group.

$R^3$ represents an amino group or hydroxyl group. The bonding position of $R^3$ is usually ortho or para position to a benzoylamino group, preferably para position to a benzoylamino group.

As the method of producing the present compound, the following method and the like are exemplified.

First, a bisazo compound of the formula (III)

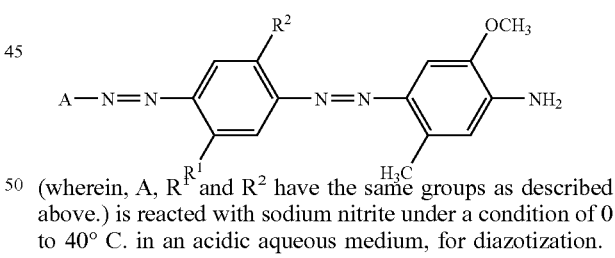

(wherein, A, $R^1$ and $R^2$ have the same groups as described above.) is reacted with sodium nitrite under a condition of 0 to 40° C. in an acidic aqueous medium, for diazotization.

The resulted diazo compound can be reacted with a compound of the formula (IV) in an aqueous medium under conditions of 0 to 40° C. and pH 6 to 11, to obtain the present compound of the formula (II).

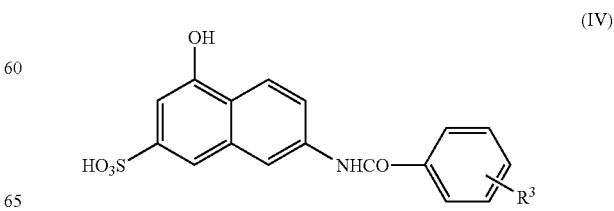

(wherein, $R^3$ has the same groups as described above.)

As the sodium salt of the present compound of the formula (II), the following (II-1) to (II-7) are exemplified.
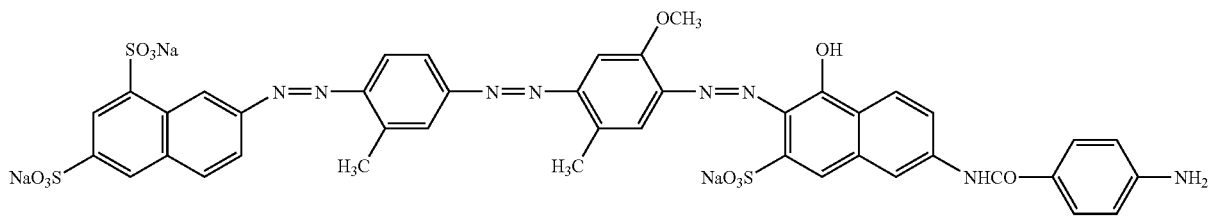
(II-1)
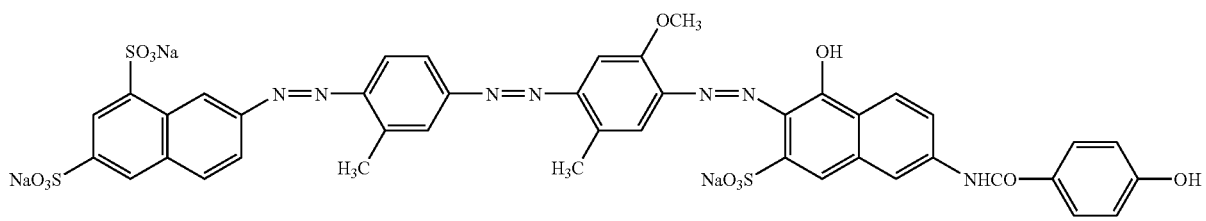
(II-2)
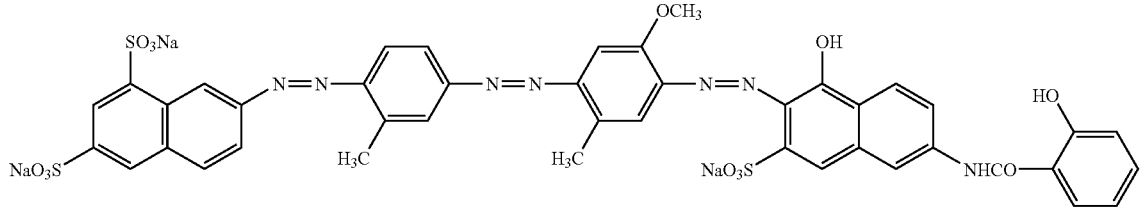
(II-3)
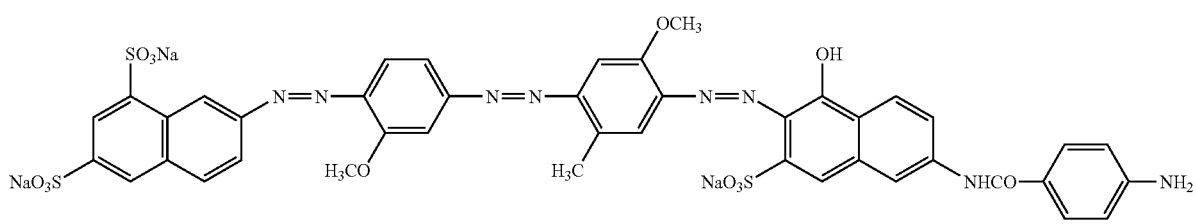
(II-5)
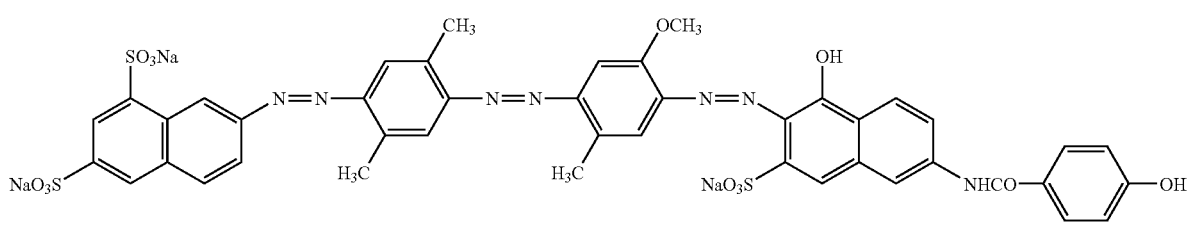
(II-6)

-continued

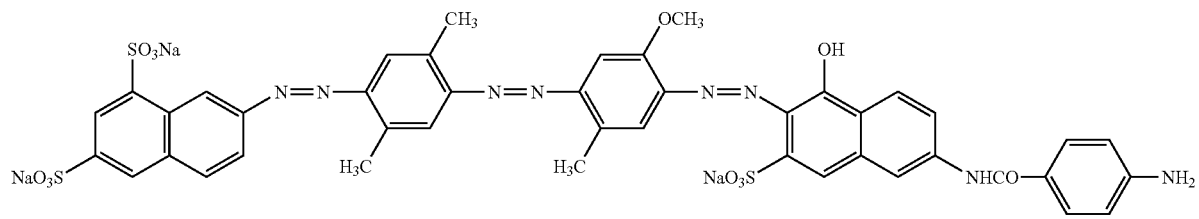

(II-7)

Next, as the method of producing the present compound of the formula (I), for example, a method in which, when Me in the formula (I) is copper, copper salts such as a copper sulfate, copper chloride, copper acetate and the like, preferably copper sulfate is added to an aqueous solution containing the compound of the formula (II) obtained above, and the mixture is heated at about 70 to 100° C., or other method is exemplified. To the copper salt, if necessary, lithium salts such as lithium carbonate, lithium hydrogen carbonate and the like, sodium salts such as sodium carbonate, sodium hydrogen carbonate and the like, potassium salts such as potassium carbonate, potassium hydrogen carbonate and the like, amines such as ammonia, monoethanolamine, diethanolamine, monopropanolamine, pyridine and the like may be further added.

When Me in the present compound (I) is copper and in the case of a sodium salt, the following (I-1) to (I-7) are exemplified.

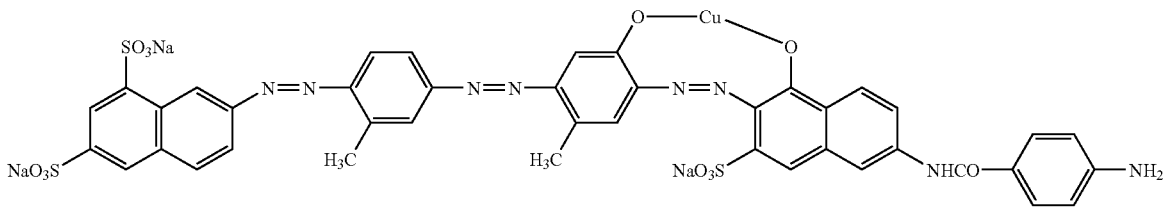

(I-1)

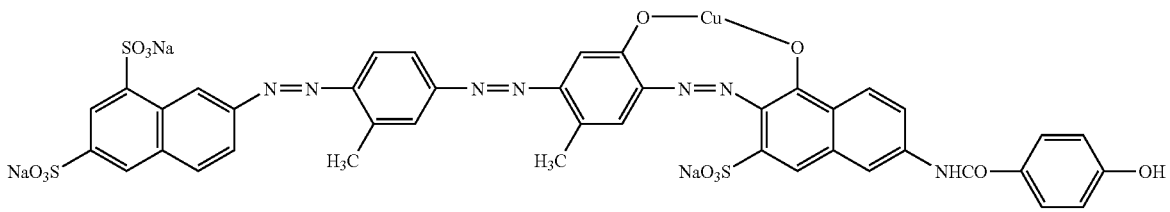

(I-2)

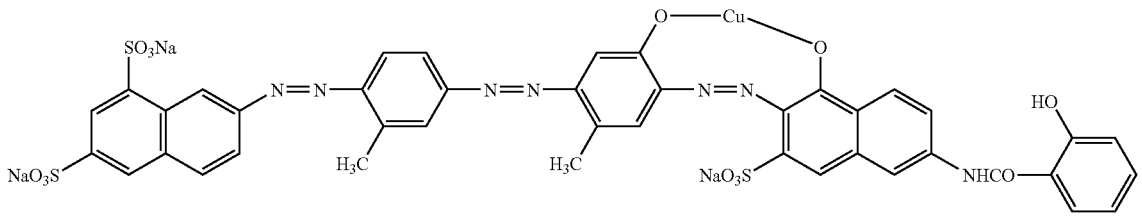

(I-3)

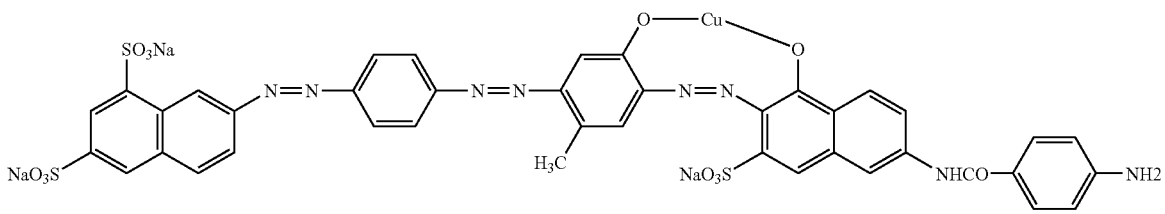

(I-4)

-continued

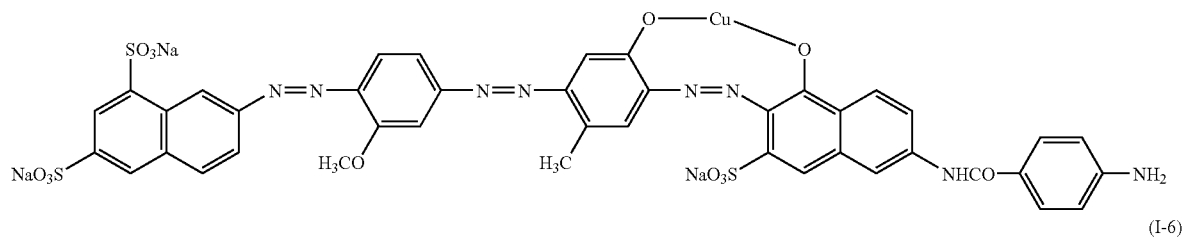
(I-5)

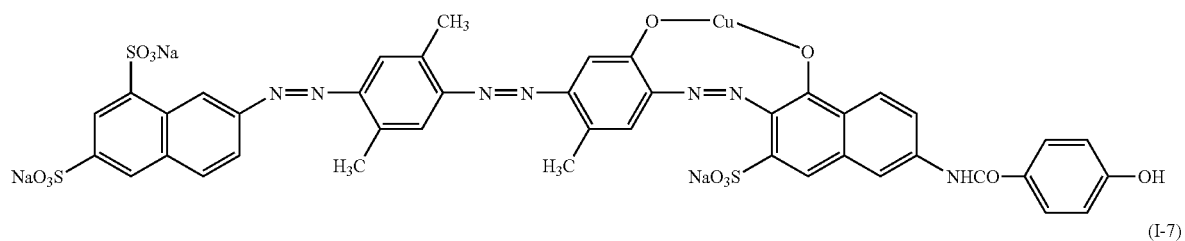
(I-6)

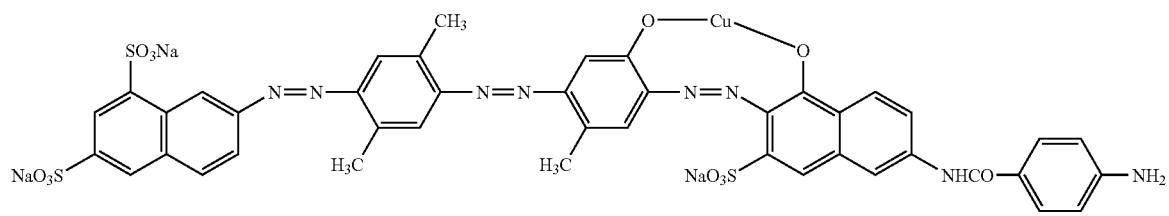
(I-7)

As the present compound, alkali metal salts such as lithium salt, sodium salt, potassium salt and the like; organic amine salts such as ethanolamine salt, alkylamine salt and the like; ammonium salt and the like are listed. Among them, sodium salts are preferable since there is a tendency that they are easily contained in a polarization film substrate.

The present compound usually gives a polarization film having an excellent degree of polarization of about 90% or more in wavelengths of about 550 to 680 nm.

The polarization film of the present invention is a polarization film comprising a dye for polarization film containing the present compound and a polarization film substrate. The dye for polarization film may be a dye composed singly of the present compound, however, it contains the present compound and other organic dye for improving a polarization performance even at wavelengths other than 550 to 680 nm. Here, the organic dye is usually a dye of high dichroism different from the present compound, and preferably, a dye excellent in light resistance.

As the specific organic dye, dyes represented by the following Color Index Generic Name are exemplified. The organic dyes may be used singly or in admixture of two or more.

C. I. Direct Yellow 12,
C. I. Direct Yellow 28,
C. I. Direct Yellow 44,
C. I. Direct Orange 26,
C. I. Direct Orange 39,
C. I. Direct Orange 107,
C. I. Direct Red 2,
C. I. Direct Red 31,
C. I. Direct Red 79,
C. I. Direct Red 81,
C. I. Direct Red 117,
C. I. Direct Red 247.

As the polarization film substrate, substrates made of, for example, a polyvinyl alcohol-based resin, polyvinyl acetate resin, ethylene/vinyl acetate (EVA) resin, polyamide resin, polyester resin and the like are mentioned. Here, the polyvinyl alcohol-based resin includes polyvinyl alcohol which is a partial or complete saponified substance of polyvinyl acetate; saponified substances of copolymers of vinyl acetate with other copolymerizable monomer (for example, olefins such as ethylene and propylene, unsaturated carboxylic acids such as crotonic acid, acrylic acid, methacrylic acid, maleic acid and the like, unsaturated sulfonic acids, vinyl ethers and the like) such as a saponified EVA resin and the like; polyvinyl formal and polyvinyl acetal obtained by modifying polyvinyl alcohol with an aldehyde, and the like. As the polarization film substrate, films made of polyvinyl alcohol-based resins, particularly, a film of polyvinyl alcohol itself is suitably used from the standpoints of the adsorption property and orientation property of a dye.

As the method of producing a polarization film, the following method can be exemplified. First, a dye for polarization film is dissolved in water at a concentration of about 0.0001 to 10 wt %, to prepare a dye bath. If necessary, a dyeing aid may be used, and for example, a method is suitable using Glauber's salt in an amount of 0.1 to 10 wt % in a dyeing bath.

A polarization film substrate is immersed in thus prepared dyeing bath, and dyeing is effected. The dyeing temperature is preferably 40 to 80° C. Orientation of a dye is conducted by stretching a polarization film substrate before dyeing or a dyed polarization film substrate. As the stretching method, for example, wet methods and dry methods and the like are listed.

Post treatments such as boric acid treatment and the like may be performed for the purpose of improving the beam transmittance, degree of polarization and light resistance of a polarization film. The boric acid treatment is conducted in a temperature range of 30 to 80° C., preferably 50 to 80° C. using a boric acid aqueous solution prepared at a concentration in a range of 1 to 15 wt %, preferably 5 to 10 wt % though varying depending on the kind of a polarization film substrate used and the kind of a dye used. Further, if necessary, a fix treatment may be used in combination using an aqueous solution containing a cationic polymer compound.

The polarization film of the present invention comprising a dye for polarization film containing a poly-azo compound or salt thereof, and a polarization film substrate is excellent in light resistance by which the absorbance of a polarization film does not decrease even if irradiated with light of large quantity under a high temperature environment for a long period of time. The polarization film of the present invention shows excellent polarization absorbance at least in a wavelength range of 550 to 680 nm.

The polarization film of the present invention can be suitably used in liquid crystal displays of large light quantity such as car navigations, liquid crystal projectors, televisions for projection and the like, due to its excellent properties.

EXAMPLES

The present invention will be illustrated further in detail based on examples, but it is needless to say that the scope of the present invention is not limited to the examples at all. % and parts in examples and comparative examples are % by weight and parts by weight unless otherwise stated.

Example 1

Production Example of the Present Compound 170 parts of a bisazo compound of the formula (III-1)

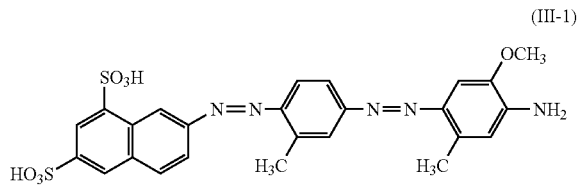

(III-1)

and 30 parts of sodium nitrite were added to 1500 parts of water, then, 120 parts of 35% hydrochloric acid was added to this at 20 to 30° C. and the mixture was stirred for 2 hours, causing diazotization. Excess sodium nitrite was deleted by adding a sulfamic acid, to obtain diazo liquid.

Next, the above-mentioned diazo liquid was added over a period of 1 hour into liquid containing a compound of the formula (IV-1)

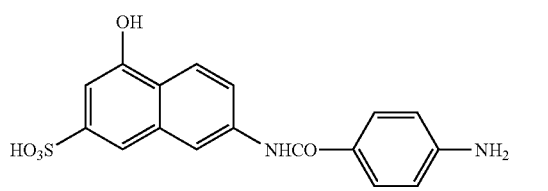

(IV-1)

while maintaining pH at 7 by adding a sodium carbonate aqueous solution. After completion of addition, the mixture was further stirred for 1 hour, to obtain a poly-azo compound of the general formula (II-1). λmax of this poly-azo compound showed 565 nm in an aqueous medium.

25 parts of a compound of the formula (II-1) was added to 500 parts of water, and 6 parts of anhydrous copper sulfate and 8 parts of monoethanolamine were added to this and the mixture was heated at 95° C. and reacted for 12 hours. Then, the mixture was cooled to 30° C., then, 35% hydrochloric acid was added to control pH to 7, then, salting out was effected using sodium chloride, and the deposited crystal was filtrated, obtaining a polyazo compound of the formula (I-1). λmax of this poly-azo compound showed 598 nm in an aqueous medium.

Production Example of Polarization Film

A polyvinyl alcohol film [Kuraray Vinylon #7500, manufactured by Kuraray Co., Ltd.] having a thickness of 75 μm was stretched five-fold along longitudinal axis, giving a polarization film substrate. This polyvinyl alcohol film was immersed, while keeping its tense condition, into an aqueous solution of 70° C. containing 0.025% of a salt of the poly-azo compound (1) obtained in the above-mentioned <Production example of the present compound>and 0.2% of Glauber's salt (dyeing aid). Then, this was immersed in a 7.5% boric acid aqueous solution of 78° C. for 5 minutes, then, taken out and washed with water of 20° C. for 20 seconds, and dried at 50° C. to obtain a polarization film. λmax of the resulted polarization film (wavelength at which transmittance along stretching direction of the film is minimum, applied also in the later descriptions) was 610 nm. The degree of polarization of this polarization film at 610 nm was measured, to find that the degree of polarization at a single body transmittance of 43% was 99.8%.

When the resulted polarization film was irradiated with light by a high pressure mercury lamp having an illumination intensity of 405 mW/cm² (red light) for 120 hours under a condition of 100° C., the value of ΔA (%) was 94 (%), revealing that light resistance against exposure for a long period of time under high temperatures was also excellent. ΔA (%) is defined as described below:

$$\Delta A(\%)=(A(120)/A(0))\times 100$$

when the value of absorbance at 0 hour is represented by A (0) and the value of absorbance after 120 hours is represented by A (120). Larger ΔA means more excellent light resistance.

Comparative Example 1

A polarization film was obtained in the same manner as in Example 1 using the above-mentioned formula (B) (compound described in Example 63 of patent literature 1) instead of the dye for polarization film containing the poly-azo compound (I-1). The degree of polarization of the resulted polarization film was measured to find that the degree of polarization at a single body transmittance of 43% was 98.0%, revealing inferior performance to the polarization film of the present invention. Further, when a polarization film was produced and irradiated with light by a high pressure mercury lamp having an illumination intensity of 405 mW/cm² (red light) for 120 hours under a condition of 100° C. in the same manner as in Example 1, the value of ΔA (%) was 81 (%), revealing inferior light resistance to the polarization film of the present invention.

What is claimed is:

1. The polarization film comprising a dye for polarization film containing a poly-azo compound selected from the group consisting of compounds of the formula (I) and compounds of the formula (II),

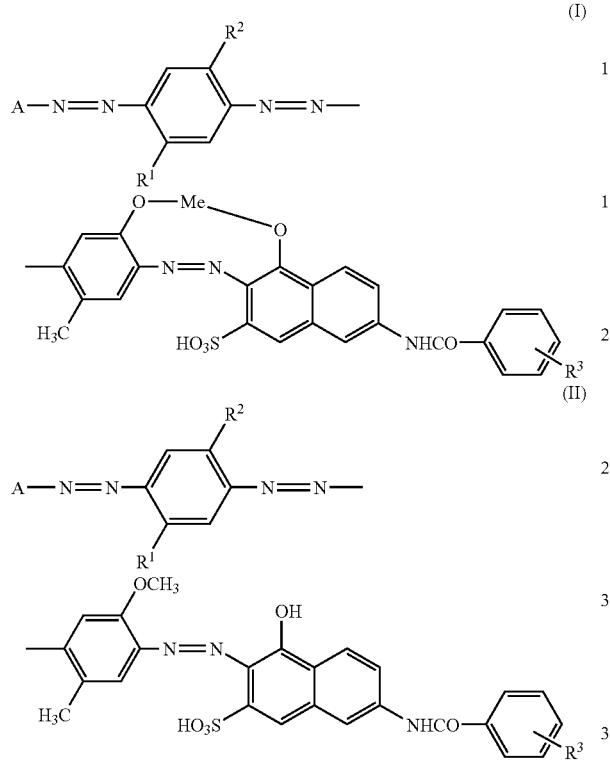

wherein, Me represents copper, nickel, zinc or iron, A represents a naphthyl group having 2 sulfonic groups and further optionally having an alkyl group or alkoxy group, $R^1$ and $R^2$ each independently represents a hydrogen atom or alkyl group, and $R^3$ represents an amino group or a hydroxyl group; and a polarization film substrate.

2. The polarization film according to claim 1, wherein the dye for polarization film further contains an organic dye different from the poly-azo compound.

3. The polarization film according to claim 2, wherein the organic dye is at least one selected from the group consisting of organic dyes represented by the following Color Index Generic Name:

C. I. Direct Yellow 12,
C. I. Direct Yellow 28,
C. I. Direct Yellow 44,
C. I. Direct Orange 26,
C. I. Direct Orange 39,
C. I. Direct Orange 107,
C. I. Direct Red 2,
C. I. Direct Red 31,
C. I. Direct Red 79,
C. I. Direct Red 81,
C. I. Direct Red 117,
C. I. Direct Red 247.

4. The polarization film according to claim 1, wherein the polarization film substrate is a substrate made of a polyvinyl alcohol resin.

5. A liquid crystal display comprising the polarization film according to claim 4.

* * * * *